United States Patent [19]

Stutz

[11] 4,043,414
[45] Aug. 23, 1977

[54] WEIGHING SCALE WITH COMPENSATING WEIGHTS

[75] Inventor: Andreas Stutz, Aathal, Switzerland

[73] Assignee: Mettler Instrumente AG, Greifensee-Zurich, Switzerland

[21] Appl. No.: 697,026

[22] Filed: June 17, 1976

[30] Foreign Application Priority Data

Aug. 15, 1975 Switzerland .................... 10649/75

[51] Int. Cl.$^2$ .......................................... G01G 21/26
[52] U.S. Cl. ..................................... 177/248; 177/252
[58] Field of Search ............... 177/248, 246, 252, 191, 177/237

[56] References Cited

U.S. PATENT DOCUMENTS 1,944,071  1/1934  Essmann .............................. 177/237
3,004,618  10/1961  Meier ................................... 177/248

Primary Examiner—Joseph W. Hartary
Attorney, Agent, or Firm—Hans Berman

[57] ABSTRACT

In a weighing scale in which compensating weights may be attached to or removed from a weighing pan assembly to adjust the combined mass of the assembly, of an object on the weighing pan that is to be weighed, and of the attached compensating weights within range of an indicating device, the adjusting arrangement includes a carrier on which guides defining respective paths of longitudinal sliding movement for the elongated compensating means, and a stop limits the sliding movement of each weight in a fixed, lowermost position, the paths being inclined relative to the horizontal at a preferred angle of 10° – 20°.

12 Claims, 3 Drawing Figures

WEIGHING SCALE WITH COMPENSATING WEIGHTS

This invention relates to weighing scales, and particularly to an improvement in the type of weighing scale in which compensating weights may be attached to or removed from a pivotally suspended weighing pan assembly to bring the combined mass of the assembly, the attached weights, and an object to be weighed within range of an indicating device of the scale.

Scales of the type described are commonly employed as analytical balances. The time required for performing a weighing on such a balance is affected significantly by oscillating movement of the weighing pan assembly. Such movement may be due to accidental factors, such as the position of the weighted object on a weighing pan, or to the very nature of the balance. Compensating weights assymmetrically arranged on a conventional weighing pan assembly relative to a vertical plane through the point of suspension cause oscillation of the assembly whenever a weight is added or removed. It has been attempted to avoid such oscillations by using annular weights centered on a vertical axis of the assembly (Swiss Pat. No. 349,808). It has also been proposed to add or remove simultaneously two compensating weights symmetrically arranged relative to the aforementioned plane.

While the known measures are effective at least to some extent, they significantly increase the cost of a weighing scale and may unduly increase the bulk of the scale.

It is a primary object of this invention to minimize oscillations of a weighing pan assembly upon addition or removal of compensating weights, as far as they are due to inherent features of the scale, and to do so at low cost and in a simple manner.

With these and other objects in view, the invention provides an improvement in a weighing scale in which a weighing pan assembly adapted to receive the object to be weighed is pivotally suspended from a supporting structure and provided with means for adjusting the gravitational force transmitted by the suspended assembly to the supporting structure to a value similar to a predetermined value so that a difference between the similar value and the predetermined value is within range of an indicating device on the scale. Known adjusting means include a carrier fastened to the pan assembly, a plurality of compensating weights, and a shifting mechanism on the supporting structure which can shift each weight to and from a position of load transmitting engagement with the carrier.

According to a specific aspect of this invention, the adjusting means are improved by providing guide means on the carrier which define respective paths of longitudinal sliding movement for the compensating weights which are elongated, these paths being obliquely inclined to the horizontal when the assembly with the fastened carrier is suspended from the supporting structure. The sliding movement of each compensating weight is limited by a stop arrangement on the carrier to a fixed, lowermost position of load transmitting engagement.

Other features, additional objects, and many of the attendant advantages of this invention will readily be appreciated as the same becomes better understood by reference to the following detailed description of a preferred embodiment when considered in connection with the appended drawing in which.

Figure 1:
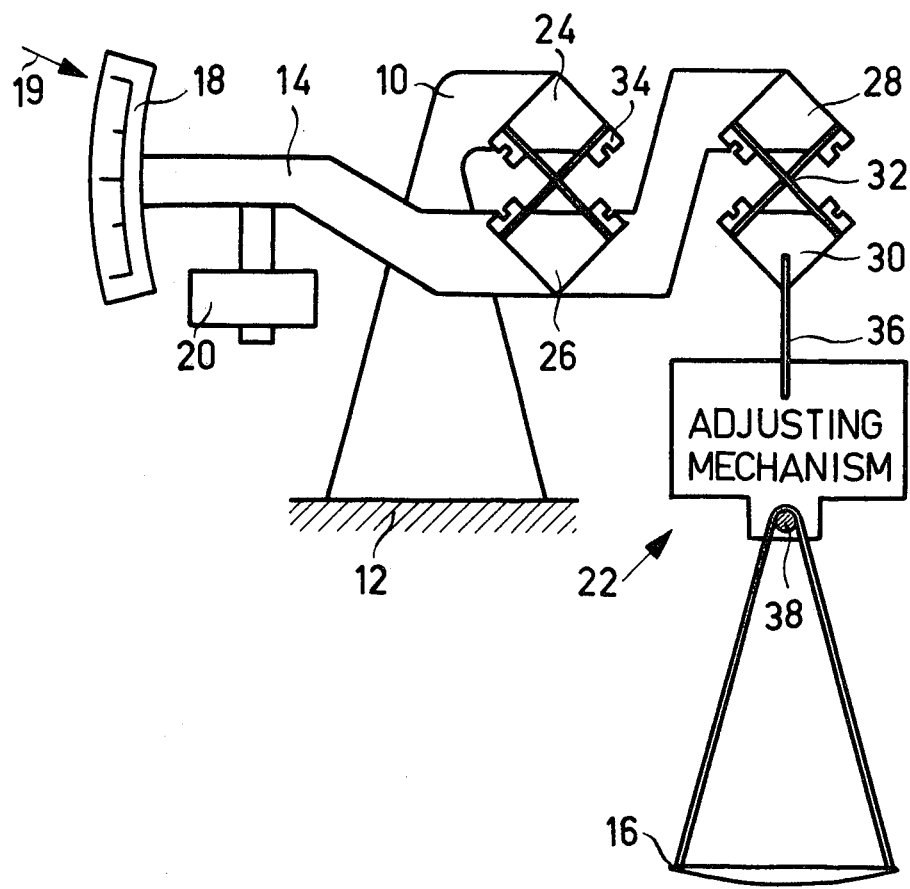
FIG. 1 shows a precision balance equipped with the improved adjusting mechanism of the invention in simplified front elevation, and partly in a conventional manner.

Referring now to the drawing in detail, and initially to FIG. 1, there is seen a fulcrum standard 10 which is an element of the normally stationary supporting frame 12 of the illustrated analytical balance. A scale beam 14 pivotally mounted on the standard 10 carries a weighing pan 16 on one arm and a graduated scale 18 and a counterpoise 20 on the other arm, the scale 18 in cooperation with a fixed index mark 19, such as a beam of light, indicating a deviation of the beam 14 from an angular position of equilibrium. An adjusting mechanism 22 is interposed between the weighing pan 16 and the associated arm of the beam 14 in a manner presently to be described.

The beam 14 is suspended from a horizontally elongated bar 24 fixedly mounted on the standard 10. The uniform cross section of the bar 24 is a square having a normally vertical diagonal, the lowest corner of the square being cut off. A section 26 of the same bar stock is fixedly fastened to the beam 14 so as to project horizontally from two opposite faces of the beam, the cut-off cross-sectional corner of the section 26 facing upward. Another longitudinal section 28 is mounted on the free end of the arm carrying the pan 16 opposite yet another section 30 secured to the pan assembly, the sections 24, 26, 28, 30 being elongated in a common direction and longitudinally coextensive.

Normally straight, thin and narrow metal straps 32 are fastened to the bar stock sections 24, 26, 28, 30 by screws 34. Only two identical straps 32 are seen to be associated with the bar sections 24, 26 and to be of such length that two rectangularly offset faces of the bar section are respectively aligned with two corresponding faces of the section 26 on the side of the beam 14 directed toward the viewer, and each straight strap 32 is attached to two aligned faces and rectangularly offset from the other strap 32. Another pair of straps 32 is obscured in the view of FIG. 1 and arranged on the far side of the beam 14. The bar sections 28, 32 are fastened to each other in the same manner by four straps 32, the width of each strap, not seen in FIG. 1, being greater than the thickness and smaller than the length of the strap.

The straps 32 consist of spring-temper metal, steel or bronze, and are cut from sheet or strip stock. Two identical straps 36 of the same stock and of the same thickness and width as the straps 32 depend from the bar section 30 to suspend a portion of the adjusting mechanism from the beam 14, and the pan 16 is suspended from a rod 38 of the mechanism 22, as will be described in more detail with reference to FIGS. 2 and 3. The straps 32 attached to the sections 24, 26 define two planes intersecting each other in a horizontal line which is closely adjacent and parallel to the main pivot axis of the beam 14, and the corresponding horizontal line associated with the sections 28, 30 similarly defines the approximate location of a pivot axis for oscillating movement of the pan 16 in the plane of FIG. 1. Such oscillating movement is also permitted by the suspending straps 36, the direction of thickness of each strap 36 being parallel to the direction of thickness of the other strap 36 and the plane of FIG. 1.

Figure 2:
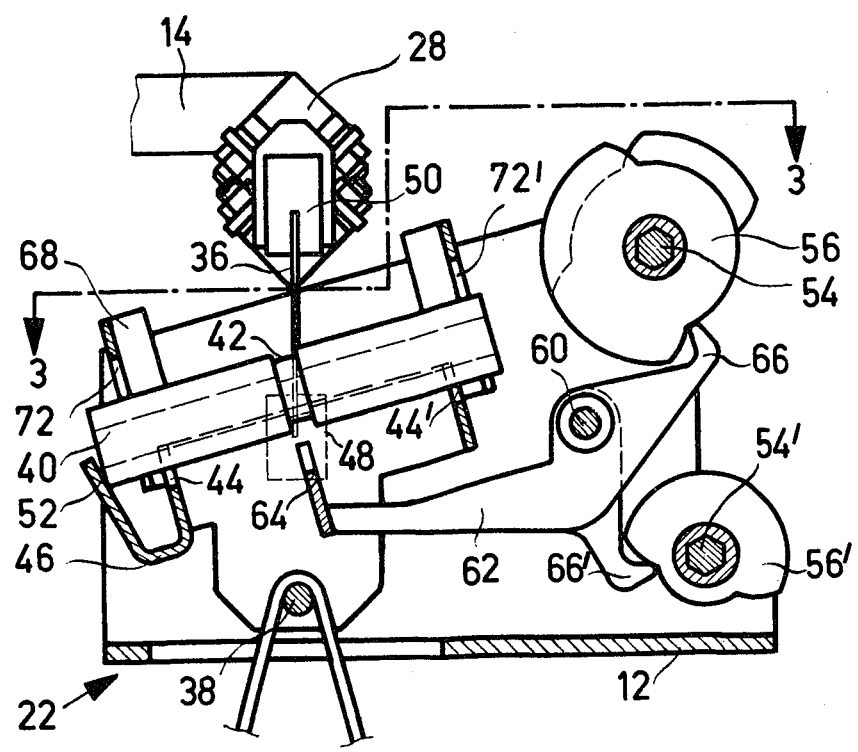
FIG. 2 illustrates the adjusting mechanism and associated elements in front elevational section on the line 2 — 2 in FIG. 3.
Figure 3:
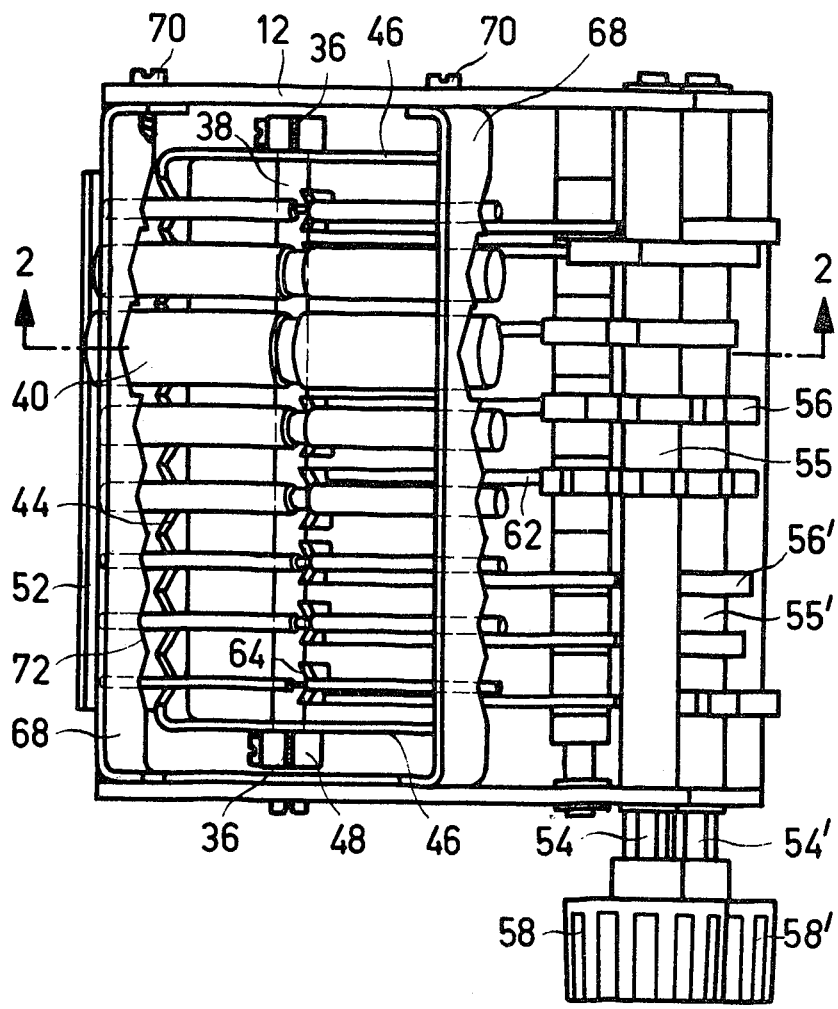
FIG. 3 shows the device of FIG. 2 in plan section on the line 3 — 3.

As is shown in greater detail in FIGS. 2 and 3, the upper ends of the straps 36 are clamped in slotted blocks 50 fixedly attached to the two ends of the bar section 30, and the lower ends are similarly clamped in blocks 48 fixedly attached to a sheet metal frame 46 which is a carrier for eight compensating weights 40. The weights are straight cylinders of stainless steel of equal axial length and are each provided with an annular, circumferential groove 42 in a radial plane which passes through or is at least contiguously adjacent the center of gravity of the weight. The weights respectively weigh 80, 40, 20, 10, 4, 2, 2, and 1 g. In the illustrated condition of the scale in which the pan 16 does not carry an object to be weighed, the beam 14 is in its angular position of equilibrium when all eight weights 40 transmit their load to the carrier frame 46.

The sheet metal of the rectangular frame 46 is provided with eight V-shaped notches 44 in one narrow, horizontal edge and corresponding notches 44' in another, horizontal, higher edge. Each pair of corresponding notches 44, 44' receives one of the weights 40 and defines a path of longitudinal sliding movement for the received weight which is obliquely inclined relative to the horizontal at an angle of about 15°. Downward sliding movement of each weight 40 is limited by an edge portion 52 of the frame 46 bent up so that an abutment face of the edge portion 52 defines an angle of about 20° with the radial end face of each abuttingly engaged weight 40.

The compensating weights 40 may be shifted individually into and out of the illustrated respective positions by means of a cam mechanism having many conventional features. Two horizontal, parallel shafts 54, 54' of hexagonal cross section are journaled in the partly illustrated balance frame 12 and carry respective groups of four radial cams 56, 56' axially separated by tubular spacers, the cams 56 on the shaft 54 being associated with the four heavy weights 40, and the cams 56' on the shaft 54' with the four light weights 40. Operating knobs 58, 58' on respective ends of the shafts 54, 54' are accessible to the operator during a weighing operation, and non-illustrated indicia on the knobs and on the frame 12 indicate which weights 40 are positioned on the carrier 46, as is known in itself.

Two groups of four levers are pivotally mounted on a shaft 60. The levers have respective shorter cam follower arms 66, 66' engaging the cams 56, 56' and identical longer arms 62 which terminate each in a lifting fork 64 dimensioned and located for engagement with the groove 42 in the associated weight 40, the arms 62 holding the cam follower arms 66, 66' engaged with the cams 56, 56' by their weight.

Another sheet metal frame 68 is fixedly fastened to the balance frame 12 by screws 70, and rows of eight downwardly open notches 72, 72' in spaced edges of the frame 68 are vertically alinged with the longitudinal axes of the weights 40 to receive the weights when lifted by the forks 64.

The operation of the balance is conventional and obvious from the structure described above. Enough weights 40 are shifted from the carrier frame 46 to the frame 68 until the gravitational force transmitted by the straps 36 to the beam 14 has a value as similar as possible to a value largely determined by the mass of the counterpoise 20. The difference between the two values may then be read from the scale 18 and index mark 19.

When the weights 40 are lowered from the notches in the stationary frame 68 into the notches of the carrier frame 46, they are guided by the notches 44, 44' to slide toward a lowermost, precise position of abutment against the edge portion 52 if they were initially deposited too far to the right, as viewed in FIG. 2. If a weight is deposited too far to the left by the associated fork 64, it slides down along the abutment face of the edge portion 52 into the same, precisely defined position shown in FIGS. 2 and 3.

The longitudinal movements of the weights 40 during their removal from or return to the carrier frame 46 are so short, and the inertia of the weighing pan assembly and of associated elements suspended from the straps 36 is so great that the operation of the adjusting mechanism cannot initiate oscillations of the pan assembly in the plane of FIG. 1. The straps 36 effectively prevent oscillations in a plane parallel to the pivot axes on the beam 14. It is possible, therefore, to support the weights 40 on the frame 46 in the array illustrated in FIG. 2 which is grossly asymmetrical relative to a vertical plane equidistant from the two straps 36. Even a compensating 80 g load and a 40 g load may be transmitted to the carrier 46 and the straps 36 in the form of a single weight 40 without inducing oscillations.

A balance of the type described has been found to be sufficiently sensitive that the accuracy of its weighings is affected by the film of moisture unavoidably adsorbed on the surfaces of the weights 40. It is important, therefore, to make the number of compensating weights as small as possible consistent with the need to shift the combined mass of the weighing pan assembly, the object supported thereon, and of the movable part of the adjusting mechanism within range of the indicating device represented in FIG. 1 by the scale 18 and the index mark 19. For a scale calibrated in fractions of one gram, the illustrated balance has a range of 0 to 160 g.

The improved adjusting mechanism 22 of this invention has been described with reference to a scale having a balance beam and a single pan partly balanced by a counterpoise. However, it is equally applicable to weighing scales in which a beam is not a movable element of supporting structure for a weighing pan assembly, such as an electromagnetic balance. Cylindrical compensating weights are manufactured to minimal tolerances at particularly low cost, but other cross-sectional shapes may be more advantageous under specific conditions.

A single groove 42 in each elongated weight 40 for engagement by a lifting fork 64 has been found to be entirely acceptable although forces in the pivoting plane of FIG. 1 are exerted on the elements supported by the straps 36 when a weight 40 is not simultaneously lifted from the notches 44, 44'. Because of the extremely short interval between release from the two notches under most unfavorable conditions, and because of the inertia of the mass suspended by the straps 36, no significant oscillations have been found to be induced by a single fork 64 acting on each weight 40 in actual embodiments of the invention. If so desired, of course, each weight may be provided with more than one circumferential groove 42 and the associated cam follower lever with a corresponding number of forks.

The path of gliding movement of the weights 40 on the carrier frame 46 may be inclined relative to the horizontal at an angle different from 15°. However, special materials of very low coefficient of friction must be employed for the weights 40 and the edges of the notches 44, 44' if the angle is smaller than 10°, and an angle of more than 20° requires release of the weights from the carrier frame in a direction sufficiently deviating from the vertical to cause difficulties if simple lifting forks are to be employed.

For analogous reasons, the angle between the abutment face of the edge portion 52 which provides a stop for the sliding movement of the weight in the notches 44, 44' and the planar, radial end faces of the weights should preferably be between 10° and 30°. Obviously, the end faces of the weights may be given a shape different from the illustrated planar configuration which is achieved inexpensively with high precision, and the edge portion 52 may have to be modified for optimum cooperation with differently shaped end faces.

The illustrated balance is equipped with pivots which rely on flexural deformation of spring metal straps, and the invention has been found to be particularly advantageous in a balance so equipped because it has no loose parts that need to be secured during transportation. The weights 40 are fixedly held when the knobs 58, 58' are turned for maximum load, and all weights are transferred to the notches in the stationary frame 68. However, an analytical balance having bearings provided with knife edges and agates can benefit substantially from this invention.

It should be understood, therefore, that the foregoing disclosure relates only to a preferred embodiment of the invention, and that it is intended to cover all changes and modifications of the example of the invention herein chosen for the purpose of the disclosure which do not constitute departures from the spirit and scope of the invention set forth in the appended claims.

What is claimed is:

1. In a weighing scale including a support; weighing pan means for receiving an object to be weighed; suspending means for suspending said weighing pan means from said support and for thereby transmitting gravitational force to said support; adjusting means for adjusting said force to a value similar to a predetermined value and including a carrier fastened to said weighing pan means, a plurality of compensating weights, and shifting means on the support for shifting each of said weights to and from a position of load transmitting engagement with said carrier; and indicating means for indicating a difference between said similar value and said predetermined value, the improvement in said adjusting means which comprises:
    a. guide means on said carrier, each of said compensating weights being elongated, and said guide means defining respective paths of longitudinal sliding movement for said compensating weights, said paths being obliquely inclined relative to the horizontal when said pan means with the fastened carrier is suspended from said support by said suspending means; and
    b. stop means on said carrier limiting said sliding movement of each compensating weight to a fixed, lowermost position of said load transmitting engagement.

2. In a weighing scale as set forth in claim 1, said support including a base, a scale beam mounted on said base for pivotal movement about a main axis, said suspending means suspending said weighing pan means from a portion of said beam spaced from said main axis, each of said paths being inclined relative to said horizontal at an angle of 10° to 20°.

3. In a weighing scale as set forth in claim 2, each of said compensating weights having a planar end face transverse to the direction of elongation, said stop means including an abutment face engaged by said end face in said lowermost position of each compensating weight and obliquely inclined relative to the engaged end face at an acute angle.

4. In a weighing scale as set forth in claim 3, said acute angle being 10° to 30°.

5. In a weighing scale as set forth in claim 1, each compensating weight having a longitudinal axis and being formed with at least one annular groove about said axis, said at least one annular groove defining a plane transverse to said axis and contiguously adjacent the center of gravity of said weight, said shifting means including a shifting member associated with each weight and movable on said support toward and away from engagement with the associated weight in said at least one groove, and for further joint movement with the engaged weight away from said lowermost position of said weight.

6. In a weighing scale as set forth in claim 5, each compensating weight having two axially terminal portions axially bounded by said at least one groove and of uniform cross section.

7. In a weighing scale as set forth in claim 6, said cross section being circular.

8. In a weighing scale as set forth in claim 5, receiving means on said support for receiving said engaged weight when moved away from said lowermost position thereof by said associated shifting member.

9. In a weighing scale as set forth in claim 1, said suspending means including two spaced flexible members, each flexible member having respective portions fixedly fastened to said support and to said carrier, said weighing pan means depending from said carrier.

10. In a weighing scale as set forth in claim 9, said flexible members being of sheet material, the direction of thickness of each member being parallel to the corresponding direction of the other member and transverse to the spacing of said flexible members, the width and length of each flexible member being greater than the thickness thereof.

11. In a weighing scale as set forth in claim 10, said compensating weights being juxtaposed on said carrier in a direction perpendicular to said direction of thickness.

12. In a weighing scale as set forth in claim 11, said compensating weights being of at least four different masses, one only of said compensating weights being of the greatest of said four masses, and only one of said compensating weights being of the next-to-greatest mass.

* * * * *